United States Patent
Ursell et al.

(10) Patent No.: US 10,661,413 B2
(45) Date of Patent: May 26, 2020

(54) STRAIGHT EDGE CLAMP

(71) Applicant: Affinity Tool Works, LLC, Troy, MI (US)

(72) Inventors: Michael Ursell, Bloomfield Hills, MI (US); Garry Favel, Kibbitz Kadarim (IL); Tsvi Hershkovich, Karmiel (IL)

(73) Assignee: AFFINITY TOOL WORKS, LLC, Troy, MI (US)

( * ) Notice: Subject to any disclaimer, the term of this patent is extended or adjusted under 35 U.S.C. 154(b) by 0 days.

(21) Appl. No.: 15/981,867

(22) Filed: May 16, 2018

(65) Prior Publication Data

US 2018/0264631 A1  Sep. 20, 2018

Related U.S. Application Data

(63) Continuation of application No. 14/629,711, filed on Feb. 24, 2015, now Pat. No. 9,975,221, which is a continuation-in-part of application No. 14/243,935, filed on Apr. 3, 2014, now Pat. No. 10,478,947.

(51) Int. Cl.

| B25B 1/02 | (2006.01) |
|---|---|
| B25B 5/16 | (2006.01) |
| B25B 5/00 | (2006.01) |
| B25B 5/02 | (2006.01) |
| B25B 5/08 | (2006.01) |
| B25B 1/08 | (2006.01) |
| B25B 1/24 | (2006.01) |
| F16B 2/12 | (2006.01) |
| F16B 2/18 | (2006.01) |

(52) U.S. Cl.
CPC .............. *B25B 5/166* (2013.01); *B25B 1/08* (2013.01); *B25B 1/2489* (2013.01); *B25B 5/006* (2013.01); *B25B 5/02* (2013.01); *B25B 5/085* (2013.01); *F16B 2/12* (2013.01); *F16B 2/18* (2013.01)

(58) Field of Classification Search
USPC ......................................... 269/149, 171, 212
See application file for complete search history.

(56) References Cited

U.S. PATENT DOCUMENTS

| 775,659 | A | 11/1904 | Jorgensen |
|---|---|---|---|
| 881,530 | A | 3/1908 | Barker |
| 891,080 | A | 6/1908 | Krogh |
| 2,467,272 | A | 4/1949 | Prenveille |
| 2,607,124 | A | 8/1952 | Dery |
| 3,107,909 | A | 10/1963 | Kuchenbecker, Sr. |
| 3,406,958 | A | 10/1968 | Geneloni et al. |
| 3,815,894 | A | 6/1974 | Olson |

(Continued)

FOREIGN PATENT DOCUMENTS

| DE | 102006030825 | 1/2008 |
|---|---|---|
| GB | 2167996 | 6/1986 |

*Primary Examiner* — Joseph J Hail
*Assistant Examiner* — Shantese L McDonald
(74) *Attorney, Agent, or Firm* — William H. Honaker; Dickinson Wright PLLC (57) ABSTRACT

The present invention relates to a straight edge clamp that has a clamping head assembly and a stop assembly mounted upon the body of the straight edge. The head and stop are not connected together and the stop assembly is free to move with respect to the head assembly. The straight edge clamp body includes at least two sections that are hinged together to allow the sections to be folded upon one another when not in use and unfolded when in use.

12 Claims, 8 Drawing Sheets

(56) References Cited

U.S. PATENT DOCUMENTS

| | | | |
|---|---|---|---|
| 4,077,290 A | 3/1978 | Hrenha | |
| 4,170,345 A | 10/1979 | Townsend | |
| 4,291,602 A | 9/1981 | Fast et al. | |
| 4,394,800 A | 7/1983 | Griset | |
| 4,490,920 A | 1/1985 | Griset | |
| 4,499,667 A * | 2/1985 | Griset | B23B 47/287 |
| | | | 33/437 |
| 4,516,874 A | 5/1985 | Yang et al. | |
| 4,741,387 A | 5/1988 | Strong | |
| 4,989,654 A | 2/1991 | Berkeley | |
| 5,348,276 A | 9/1994 | Blacker | |
| 5,401,354 A | 3/1995 | Colucci | |
| 5,494,553 A | 2/1996 | Colucci | |
| 5,573,230 A | 11/1996 | Lambertini | |
| 5,722,649 A * | 3/1998 | Morris | B25B 1/12 |
| | | | 269/171 |
| 5,768,966 A | 6/1998 | Duginske | |
| 5,964,041 A | 10/1999 | Daniel | |
| 6,050,559 A | 4/2000 | de Souza | |
| 6,622,997 B2 | 9/2003 | Emerson | |
| 6,665,947 B2 | 12/2003 | Kirkland | |
| 7,073,995 B2 | 7/2006 | Herb | |
| 7,147,640 B2 | 12/2006 | Huebner et al. | |
| 7,165,334 B2 * | 1/2007 | Ben-Gigi | B25H 1/0078 |
| | | | 33/443 |
| 7,168,693 B1 | 1/2007 | Sjuts et al. | |
| 7,419,148 B1 | 9/2008 | Jones et al. | |
| 7,484,306 B2 | 2/2009 | Emerson | |
| 7,621,206 B2 | 11/2009 | Makropoulos | |
| 7,631,847 B2 | 11/2009 | Kjos et al. | |
| 8,177,209 B2 | 5/2012 | Chen | |
| 8,230,611 B1 | 7/2012 | Emerson | |
| 8,413,921 B2 | 4/2013 | Umemura | |
| 9,067,306 B1 | 6/2015 | Lee | |
| 9,975,221 B2 | 5/2018 | Ursell et al. | |
| 2003/0122294 A1 | 7/2003 | Emerson | |
| 2003/0233925 A1 | 12/2003 | Makropoulos | |
| 2004/0165947 A1 | 8/2004 | Herb | |
| 2005/0028395 A1 * | 2/2005 | Liu | B23Q 1/28 |
| | | | 33/640 |
| 2005/0161113 A1 | 7/2005 | Chiu et al. | |
| 2005/0217128 A1 | 10/2005 | Ben-Gigi | |
| 2006/0272744 A1 | 12/2006 | Liu et al. | |
| 2008/0197554 A1 | 8/2008 | Sabanae | |
| 2012/0047755 A1 | 3/2012 | Emerson | |
| 2012/0174421 A1 | 7/2012 | Emerson | |
| 2014/0300042 A1 | 10/2014 | Ursell et al. | |
| 2015/0283679 A1 | 10/2015 | Ursell et al. | |
| 2015/0283680 A1 | 10/2015 | Ursell et al. | |

* cited by examiner

STRAIGHT EDGE CLAMP

RELATED APPLICATIONS

This application is a continuation of U.S. patent application Ser. No. 14/629,711 filed on Feb. 24, 2015, which is a continuation-in-part and claims the benefit of U.S. patent application Ser. No. 14/243,935 filed on filed on Apr. 3, 2014, which are incorporated herein in their entirety.

STATEMENT REGARDING FEDERALLY SPONSORED RESEARCH

NONE

TECHNICAL FIELD

This invention relates generally to a straight edge clamp and, more particularly, to a straight edge clamp with a unique clamping system which reduces weight and costs and a unique hinge system that permits the straight edge to be easily folded and unfolded between use and storage positions.

BACKGROUND

Straight edge clamps are well known for use in making straight cuts with for example a circular saw, or for guiding a router on materials, such as wood, aluminum plastic, etc. Straight edge clamps provide a straight edge secured to a work piece or work pieces so that a power tool or a guide for a power tool can be moved along the straight edge, for example, to form a cut edge with a circular hand saw or to form a trimmed edge with a hand router. Also, straight edge clamps are used for the purpose of holding accessory tools against a work piece.

U.S. Pat. No. 6,622,997 discloses a typical straight edge clamp. The straight edge clamp disclosed in the '997 patent includes a straight edge that is made of extruded aluminum and has an open channel, a fixed stop, a sliding stop that is received in the channel and can slide along the straight edge, and a bar or rod clamp that connects the sliding stop to the fixed stop. The bar extends the length of the straight edge.

The sliding stop has a body that is inserted in the channel of the straight edge, and a jaw that protrudes from the body and out of the channel to secure a work piece. The rod and interaction of the sliding stop perform the clamping function. In the locked state, the sliding stop can move toward the fixed stop since the body pushes the locking elements, a series of plates mounted on the rod, near the center of the rod and the pushing force is applied uniformly around the hole, and the locking elements can slide along the rod. However, moving in reverse direction is blocked since the slider pushes the ends of the locking element and the pushing force is applied at a point offset from the center of the holes and the rod, thereby locking the holes on the rod.

The main problem with known straight edge clamps is the need for the rod extending the length of the straight edge and the locking elements. The rod and the locking elements increase the cost of the clamp and the weight. The need for the rod also defines the length of the clamp. The clamp has a predetermined length that cannot be adjusted. The clamp length cannot be changed. Additionally, the clamp cannot be folded, since the rod is rigid and prevents any change in the length of the straight edge.

SUMMARY OF THE INVENTION

In general terms, this invention provides a straight edge clamp and, more particularly, a straight edge clamp having at least two sections that can folded upon one another for storage. The straight edge clamp of the present invention has a unique clamping system that doesn't require the rod or locking elements of known straight edge clamps.

The straight edge clamp of the present invention includes an elongated body, a clamping head assembly and an end stop assembly. There is no rod connecting the clamping head assembly and the end stop assembly, they are independently mounted and can be separately moved within the elongated body.

In the disclosed embodiment, the elongated body includes three sections and two hinge connectors for connecting the sections to form the elongated body. It should be appreciated by those of ordinary skill in the art that the number of sections determines the length of the straight edge clamp. Any number of sections can be connected together to form the straight edge clamp. In the disclosed embodiment two of the sections are approximately two feet in length and the end section is shorter, having a length of about eighteen (18) inches. The section lengths can be any other length and can all be the same length if desired.

The ability to fold the sections, due to the unique clamping system, allows a user to fold the sections when not in use for easy storage and unfold the sections when in use. Another benefit of the folding sections is that the straight edge clamp of the present invention is easier and less costly to ship than conventional straight edge clamps since it can be packaged in a smaller package, the general size of the folded sections. It is also less susceptible to damage during shipping and use, since it can be folded. A still further benefit of the folding sections is that it is easier to display at the point of purchase when compared to conventional straight edge clamps. With the straight edge clamp of the present invention, the sections can be folded for display.

The elongated body has opposed edges, a top and a bottom. A main channel is formed in the bottom. The clamping head assembly and the stop assembly are mounted within the main channel a spaced distance from one another. The clamping head assembly has a movable jaw that is movable in the direction of the stop assembly, from a released position to a clamped position. The stop assembly has a jaw that is movable in the direction away from said first jaw from an unlocked position to a locked position. The clamping head assembly and the stop assembly can also be moved along the elongated body with respect to one another. The clamping head assembly and the stop assembly are not connected together allowing the clamp head assembly and the stop assembly to be moved with respect to one another along the entire length of the elongated body.

In use, the sections are unfolded and the bottom of the elongated body is positioned against a work surface. The work surface has sides and the clamping head assembly and stop assembly are adapted to be positioned against the sides. Once positioned, the first and second jaws are moved to the clamped position. In one of the disclosed embodiments, the second jaw is moved to the clamped position by rotating a handle. The first jaw is moved to the locked position upon movement of the second jaw. The second jaw pulls the elongated body in the direction away from the stop assembly, which in turn pushes the first jaw of the end stop into the locked position. As a result, the straight edge clamp is locked onto the work surface.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

With reference to FIGS. 1, 7, 8 and 9, the straight edge clamp of the present invention is shown generally at 10. The straight edge clamp 10 includes an elongated body 12 that includes sections 15, a clamping head assembly 14 and an end stop assembly 16.

The elongated body 12 includes at least two sections 15 and in the disclosed embodiment three sections 15 connected together by hinges 19 to form the elongated body 12. It will be appreciated by those of ordinary skill in the art that the number of sections 15 that are connected together will determine the length of the straight edge clamp 10. By way of example, two of the sections in the disclosed embodiment are each approximately two feet in length and the third section 15 is about eighteen inches. It should be understood by those of ordinary skill in the art that any length and number of sections could be used and that they could all be the same length if desired, or different lengths.

Figure 1:
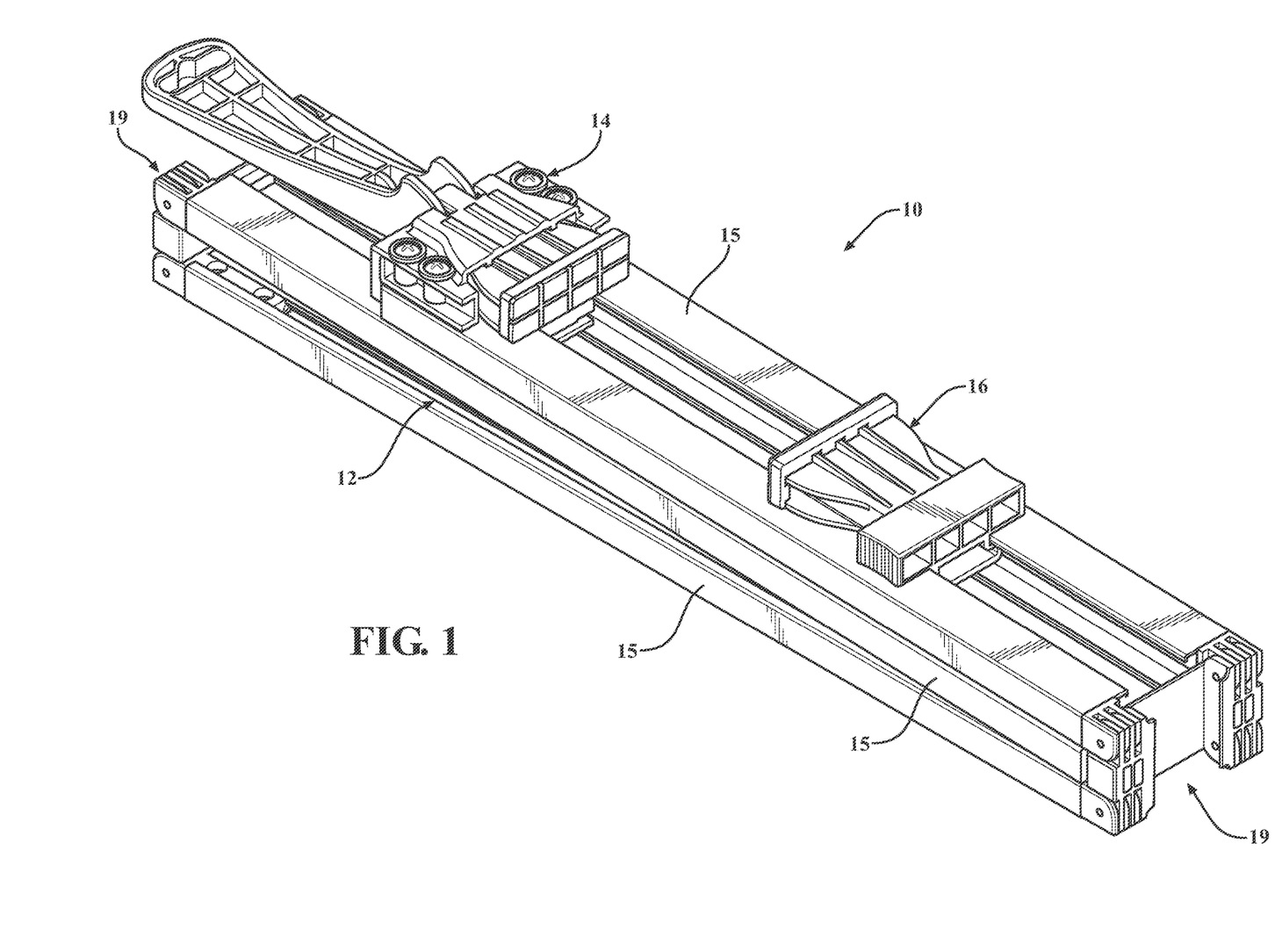
FIG. 1 is a perspective view of the folding straight edge clamp of the present invention.
Figure 2:
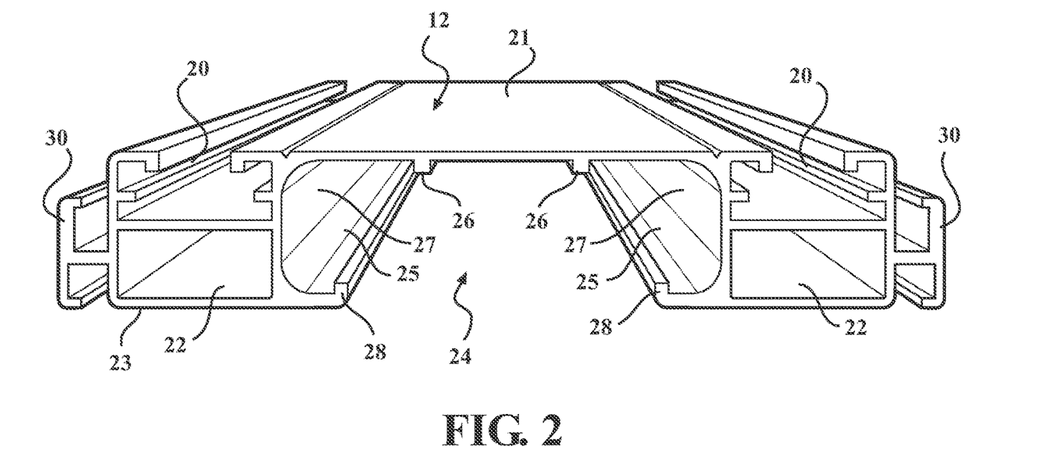
FIG. 2 is a an end view of the elongated body of the present invention.

With reference to FIG. 2, the profile of the elongated body 12 is shown. The elongated body 12 includes a top surface 21 and a bottom surface 23. The bottom surface 23 has spaced openings 22 adjoining a generally c-shaped central channel 24. In the disclosed embodiment, the central channel 24 has protrusions 26 and locator rails 28 protruding into the channel 24. There are also optional outer attachment ribs 30 and attachment grooves 20. These can be used to attach other items to the straight edge clamp 10. Also as illustrated, serration grooves 27 are provided along the walls 25 to add additional resistance to the locking mechanism which will be discussed in greater detail below.

Figure 4:
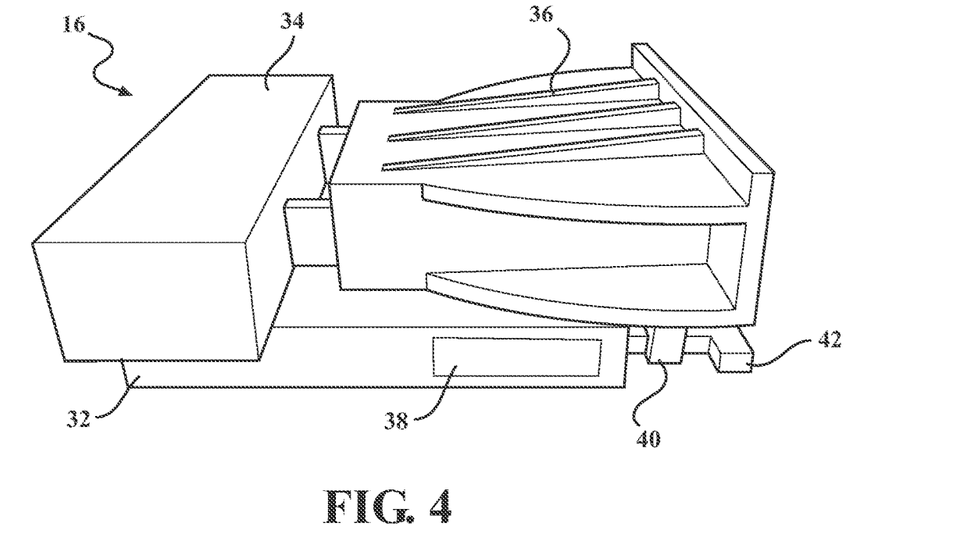
FIG. 4 is a perspective view of the end stop assembly of the present invention.
Figure 5:
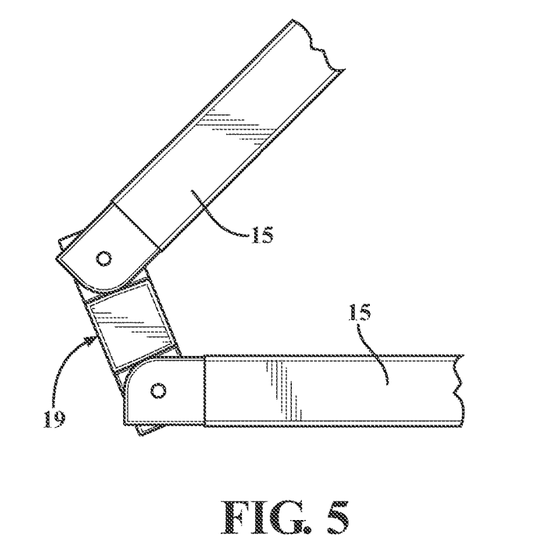
FIG. 5 is a partial side view of the hinge and elongated body sections of the present invention partially unfolded.
Figure 6:
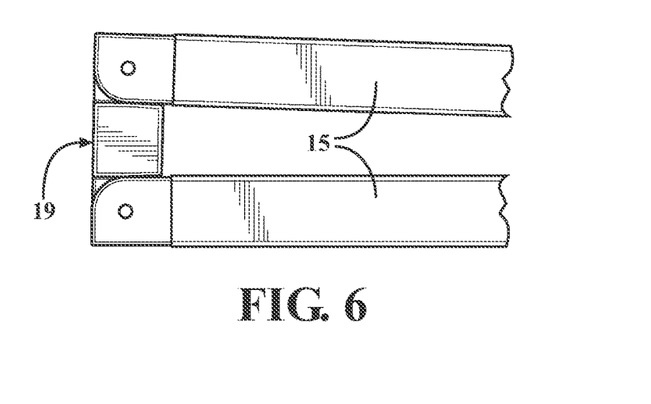
FIG. 6 is a partial side view of the hinge and elongated sections of the present invention in the folded position.
Figure 7:
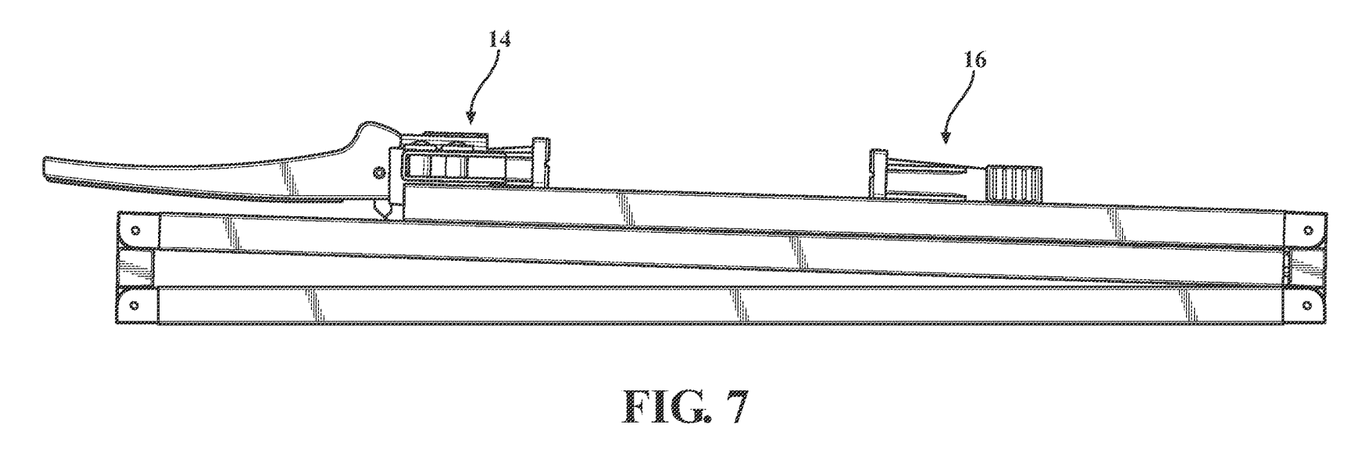
FIG. 7 is a side view of the folding straight edge clamp of the present invention.

With reference to FIG. 4, the end stop 16 will be described in greater detail. The end stop 16 has a base 32 that slides into and along the channel 24. There is a handgrip 34 on the base that facilitates the movement of the end stop along the channel 24. A first jaw 36 is movably mounted upon the base 32 and can be moved from a released position to a locked position. Clamp pads 38 are mounted within the base 32 and can be forced outwardly by the movement of the first jaw 36 to the locked position. The clamp pads 38 engage the sidewalls 25 (see FIG. 2) when the end stop 16 is in the locked position.

The first jaw 36 has limit tabs 40 that engage limit tabs 42 on the base 32. The limit tabs 42 restrict the movement of the first jaw 36 within the base 32.

Figure 8:
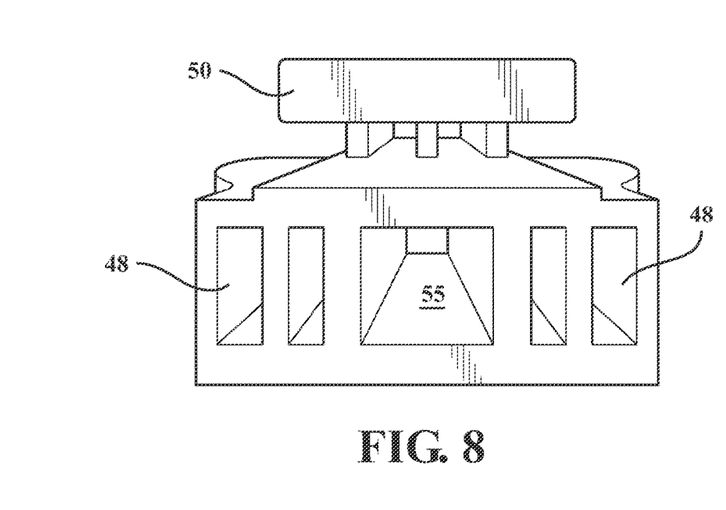
FIG. 8 is an end view of the base of the first jaw of the present invention.
Figure 9:
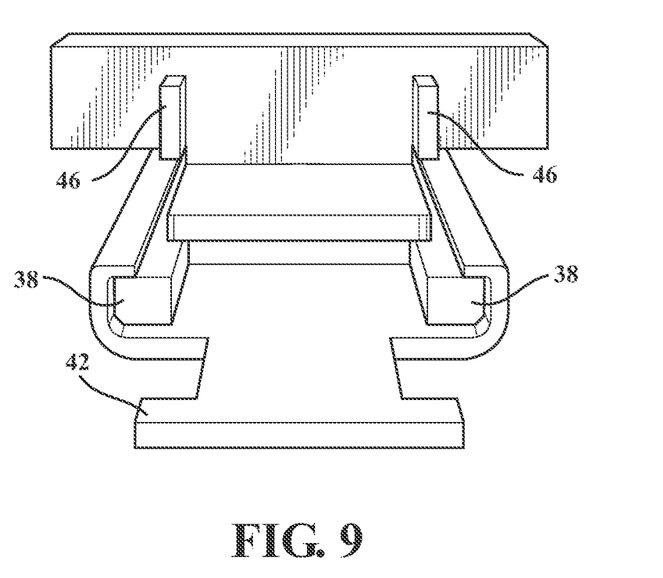
FIG. 9 is a perspective view of the base of FIG. 8.
Figure 10:
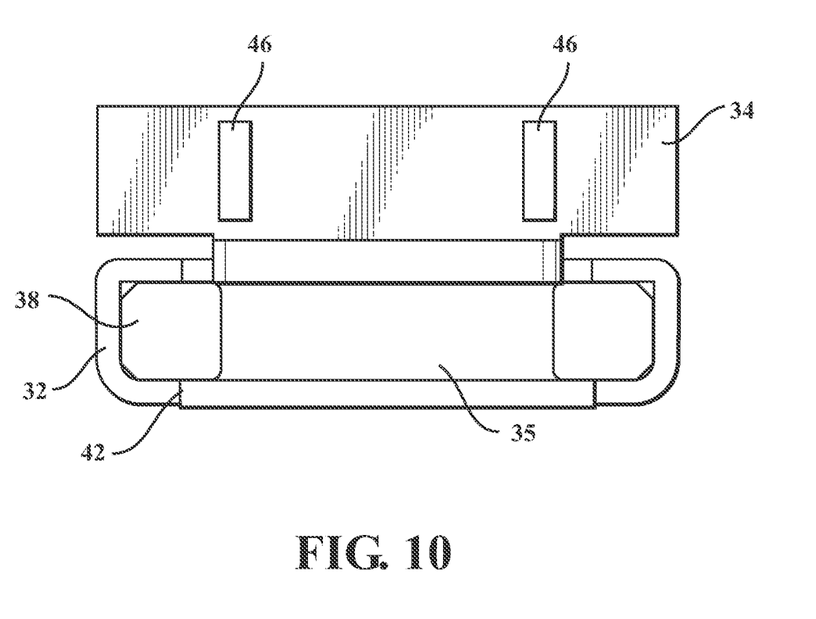
FIG. 10 is a perspective view of the wedge member of the present invention.

With reference to FIGS. 8, 9 and 10, the base 32 includes a passage 35 that receives a wedge member 50 extending from the first jaw 36. The wedge member 50 has angled sides that engage the clamp pads 38 and force them to the locked position when the wedge member 50 is forced into the passage 35. The wedge member is forced into the passage 35 and against the clamp pads 38, when the clamping head assembly 14 is engaged, as will be described in greater detail below. It should be appreciated by those of ordinary skill the art that the wedge member 50 could have a single side extending at an acute angle to the longitudinal center line of the straight edge body 12 and that only one clamp pad 38 would be needed.

Guide fingers 46 extend out of the base 32 and into guide finger pockets 48, see FIG. 10. The fingers 46 in the first pockets 48 align the first jaw 36 and facilitate its movement with respect to base 32. A second pocket 55 can also be provided to receive a spring to bias the first jaw 36 to the released position.

Figure 3:
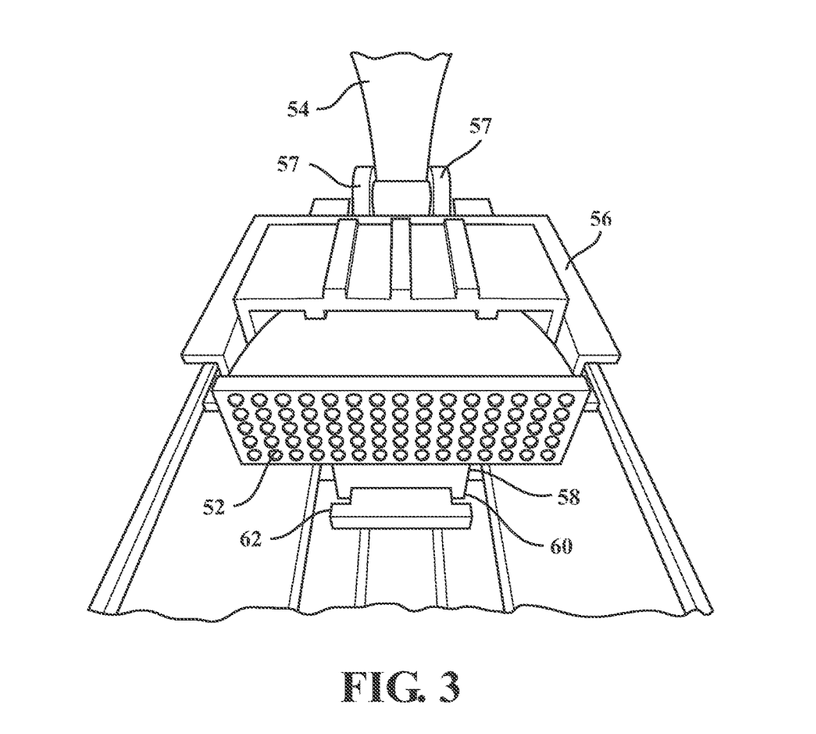
FIG. 3 is a perspective view of the clamping head assembly of the present invention.

With reference to FIG. 3, the clamping head assembly 14 will be described. The clamping head assembly 14 is fitted into the end of one of the sections of the elongated straight edge body 12. The clamping head assembly includes a second jaw 52 and a clamp actuation handle 54. The second jaw 52 is movably mounted in a clamp body 56. The handle 54 includes a cam member 57 that engages and pushes the second jaw in to the direction of the stop assembly 16 when the handle 54 is rotated. Guides 58 engage the rails 28 to facilitate the movement of the second jaw 52. Limit tabs 60 and 62 limit the movement of the second jaw 52.

In use, the bottom surface 23 of the elongated body 12 is positioned against a work surface. The work surface has sides and the clamping head assembly 14 and stop assembly 16 are adapted to be positioned against the sides. The second jaw 52 is positioned against one side of the work surface and the end stop assembly 16 is moved to engage the first jaw 36 against the other side of the work surface. Once positioned, the second jaw 52 is moved to the clamped position. In the disclosed embodiment, the second jaw 52 is moved to the clamped position by rotating handle 54. The first jaw 36 is moved to the locked position upon movement of the second jaw 52. The second jaw 52 pulls the elongated body 12 in the direction away from the stop assembly 16, which in turn pushes the first jaw 36 of the end stop 16 into the locked position. As a result, the straight edge clamp is locked onto the work surface.

With reference to FIGS. 1, 5 through 7, and 11 through 13, the hinge connector assembly of the present invention will be described. The hinge connector assembly of the present invention is shown generally at 19. The hinge 19 has a base 72 with opposed first knuckles 74. The knuckles 74 have fingers 76. The knuckles 74 are connected to four second knuckles 78, each with fingers 80. The four second knuckles 74 are each received within openings 22 in the sections 15 of the elongated body 12. The second knuckles 74 have protrusions (not shown) that are press fit into the openings 22. It will be understood that the second knuckles could be connected to the sections 15 by other known methods, such as screws, glue, etc. The fingers 76 of the knuckles 74 and fingers 80 of the knuckles 78 mate to form a hinge joint. A hinge pin 82 interconnects the knuckles 74 and 78. The hinge pin 82 is received within a hole formed in both sets of knuckles 74 and 78.

As illustrated, in the disclosed embodiment, the knuckles 74 and 78 extend outwardly from the base 72. This is important to the operation of the straight edge clamp and has a two-fold purpose. First, when the straight edge clamp is open, one side of the base 72 is parallel with the top of the elongated body to from a continuous flat surface. Additionally, when the straight edge is open, the opposite side of the base 72 is generally parallel to the inside top wall of the channel 24. In this way, the base 72 and knuckles 74 form a secondary channel 75 which is parallel with the channel 24 when the straight edge is unfolded. In this way, the channel 24 is continuous along its length and the clamping head assembly 14 and the end stop assembly 16 are free to be moved along its length. As will be appreciated, the base 72 is generally the same thickness as the thickness of the top of the elongated member 12.

Figure 11:
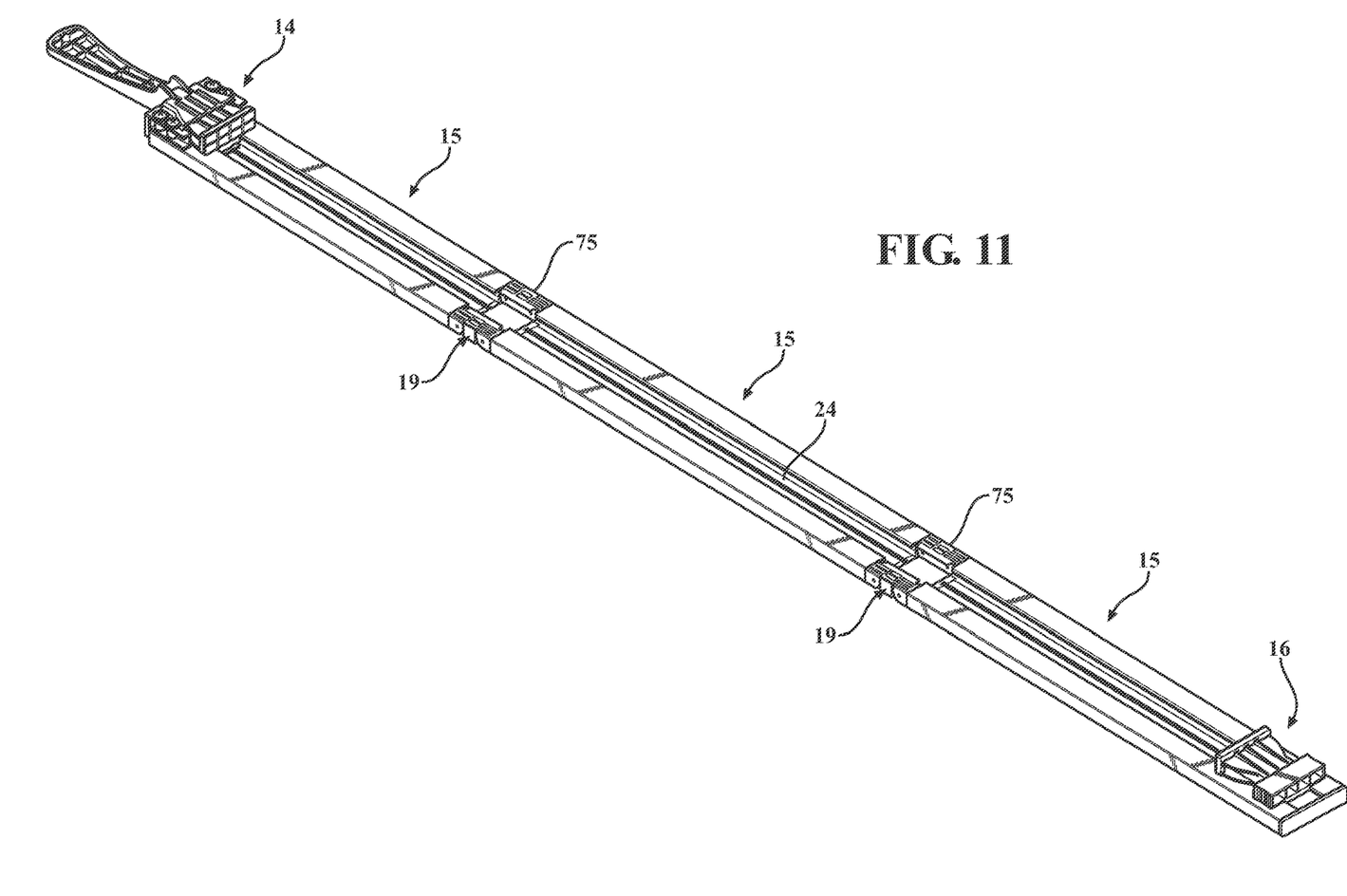
FIG. 11 is a perspective view of the straight edge clamp of the present invention in the unfolded position.
Figure 12:
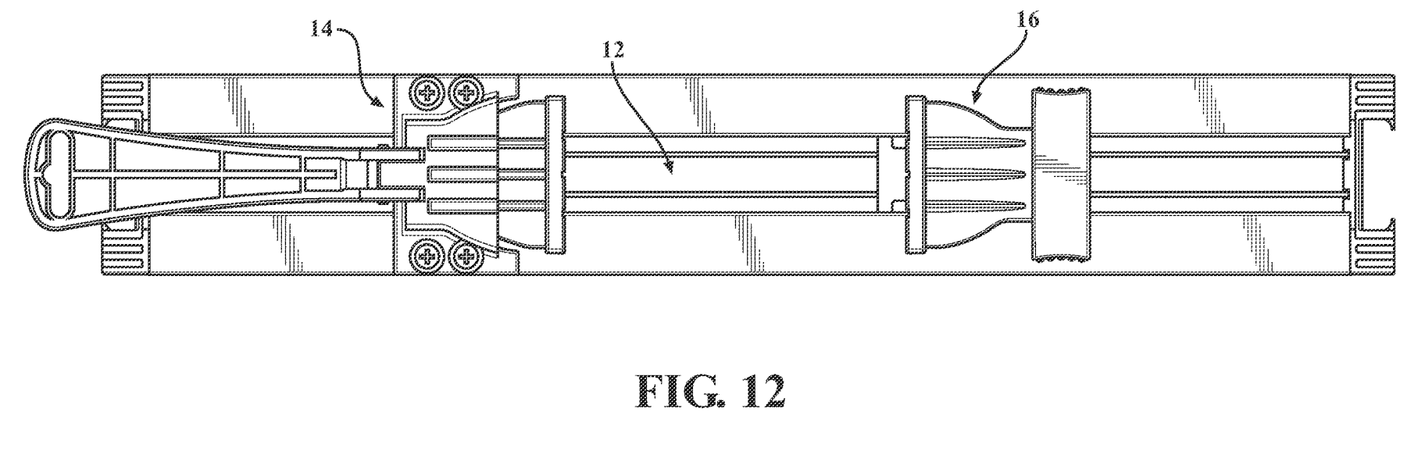
FIG. 12 is a top view of the straight edge clamp of the present invention in the folded position.
Figure 13:
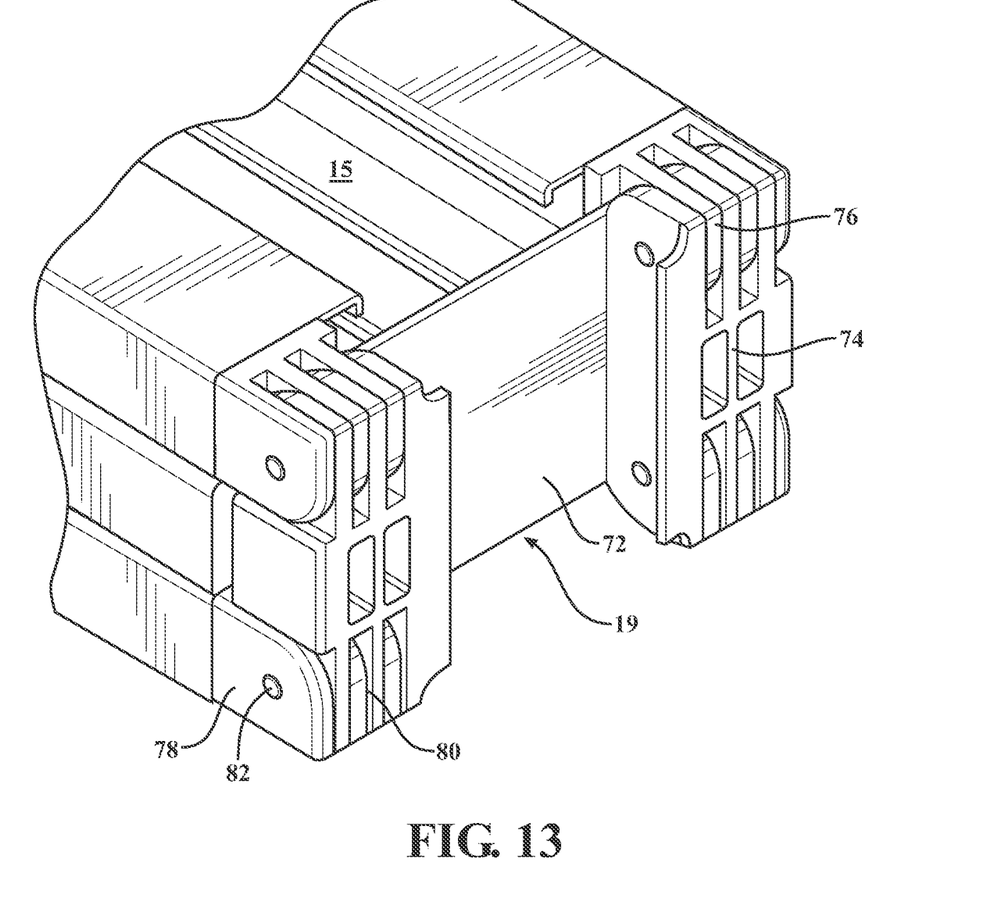
FIG. 13 is a partial end view of the hinge of the present invention.

In use, the clamping head assembly 14 and the end stop assembly 16 are both moved to one of the end most sections 15. The other sections 15 are then folded under one another to fold the elongated body, see FIGS. 1 and 12. To use, the sections 15 are unfolded as shown in FIG. 11 and then the clamping head assembly 14 and end stop assembly 16 can be moved to their desired positions along the elongated body 12.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A straight edge clamp comprising:
a straight edge;
a base mounted to said straight edge, said base being moveable with respect to said straight edge;
a jaw moveably mounted to said base and movable between a release position and a locked position;
at least one clamp pad moveable with respect to said base, said clamp pad moving into engagement with said channel to lock said base with respect to said straight edge in said locked position;
an inclined surface adjoining said at least one clamp pad; and
said jaw engaging said inclined surface whereby, in said locked position, said jaw moves said at least one clamp pad and forces said at least one clamp pad into engagement with said straight edge.

2. The straight edge clamp of claim 1, wherein said straight edge includes at least two sections, and at least one connector for connecting said sections to form a unitary elongated body.

3. A straight edge clamp comprising:
an elongated body, said elongated body has opposed ends, a top, a bottom and a main channel formed in said bottom;
a base mounted within said channel; said base being movable within said channel;
a jaw moveably mounted to said base, said jaw being moveable from a released position to a locked position;
at least one clamp pad moveable with respect to said base; said clamp pad moving into engagement with said channel to lock said base with respect to said elongated body in said locked position;
a cam surface located on said jaw and engaging said clamp pad, said cam surface camming said clamp pad between said released and locked positions.

4. The straight edge clamp of claim 3, wherein said jaw engages said clamp pad to move said clamp pad into engagement with said main channel.

5. The straight edge clamp of claim 3, wherein said elongated body includes at least two sections, and at least one connector for connecting said sections to form a unitary elongated body.

6. A straight edge clamp comprising:
an elongated body, said elongated body having a main channel formed in said bottom;
a base mounted to said channel, said base being movable within said channel;
a jaw moveably mounted to said base, said jaw being moveable from a released position to a locked position;
an angled surface and at least one clamp pad moveable with respect to said base, said angled surface being in engagement with said jaw, whereby, in said locked position, said jaw moves said angled surface thereby forcing said clamp pad into engagement with said channel to lock said base with respect to said elongated body.

7. The straight edge clamp of claim 6, wherein said angled surface is on said jaw.

8. The straight edge clamp of claim 6, wherein said elongated body includes at least two sections, and at least one connector for connecting said sections to form a unitary elongated body.

9. A straight edge clamp comprising:
an elongated body, said elongated body having opposed ends, a top, a bottom and a main channel formed in said bottom;
a base mounted within said channel; said base being movable within said channel;
a jaw moveably mounted to said base, said jaw being moveable from a released position to a locked position;
at least one clamp pad moveable with respect to said base; said clamp pad moving into engagement with said channel to lock said base with respect to said elongated body;
said jaw engages said clamp pad to move said clamp pad into engagement with said channel in said locked position.

10. The straight edge clamp of claim 9, further including a cam surface engaging said clamp pad, said cam surface camming said clamp pad between said released and locked positions.

11. The straight edge clamp of claim 9, wherein said cam surface is on said jaw.

12. The straight edge clamp of claim 9, wherein said elongated body includes at least two sections, and at least one connector for connecting said sections to form a unitary elongated body.

* * * * *